(12) United States Patent
Simonsson (10) Patent No.: US 9,618,968 B2
(45) Date of Patent: Apr. 11, 2017

(54) MOBILE COMPUTING DEVICE WITH A COMBINED HOUSING AND CONNECTOR PORT

(71) Applicant: Sony Corporation, Tokyo (JP)

(72) Inventor: Olof Simonsson, Dalby (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 285 days.

(21) Appl. No.: 14/068,843

(22) Filed: Oct. 31, 2013

(65) Prior Publication Data

US 2015/0116931 A1   Apr. 30, 2015

(51) Int. Cl.
*G06F 1/16* (2006.01)
*H04M 1/02* (2006.01)

(52) U.S. Cl.
CPC ........ *G06F 1/1613* (2013.01); *H04M 1/0274* (2013.01)

(58) Field of Classification Search
CPC ......... G06F 1/16; G06F 1/1613; H01R 9/096; H04M 1/0274; H05K 1/14; H05K 1/144; H05K 2201/10189; H05K 5/00; H05K 5/0278
USPC ...... 174/521; 257/687; 292/57, 228; 307/23; 312/223.1; 361/752, 730, 737, 679.56, 361/679.41, 785, 622–624, 634–637, 646, 361/728–729, 760, 679.58; 439/540.1
See application file for complete search history.

(56) References Cited

U.S. PATENT DOCUMENTS

| | | | | |
|---|---|---|---|---|
| 5,561,727 A | * | 10/1996 | Akita | ................... G02B 6/3897 361/785 |
| 5,830,014 A | * | 11/1998 | Lwee | ................... B23K 1/0016 228/39 |
| 5,982,624 A | * | 11/1999 | Onoda | ............. G06K 19/07743 235/492 |
| 6,144,559 A | * | 11/2000 | Johnson | ............... G01R 1/0416 174/255 |
| 6,424,842 B1 | * | 7/2002 | Winstead | ........... H01R 13/2442 455/557 |
| 6,519,144 B1 | * | 2/2003 | Henrie | ................... G06F 1/1632 361/679.41 |
| 7,046,521 B2 | * | 5/2006 | Garmong | ............. H05K 9/0001 174/125.1 |

(Continued)

OTHER PUBLICATIONS

"Online course on Embedded Systems—USB Interface tutorial covering basic fundamentals." Electronics Engineering Herald, Bangalore, India. Viewed online Oct. 21, 2013 at http://www.eeherald.com/section/design-guide/esmod14.html.

(Continued)

*Primary Examiner* — Zachary M Pape
*Assistant Examiner* — Amir Jalali
(74) *Attorney, Agent, or Firm* — Coats & Bennett, P.L.L.C (57) ABSTRACT

Mobile computing devices that include an exterior housing and a port. The housing is configured to form a guide portion of the port. More particularly, the port includes a cavity formed in the housing. The cavity includes interior walls that extend inward from an exterior wall of the housing. The port further includes a connector that is positioned in the cavity. The connector is positioned such that the walls of the cavity form the guide of the connector. The port is further constructed to prevent the ingress of water and/or debris into an interior of the housing.

17 Claims, 9 Drawing Sheets

(56) References Cited

U.S. PATENT DOCUMENTS

| | | | | | |
|---|---|---|---|---|---|
| 7,445,455 | B2* | 11/2008 | Yokozuka | ............ | H05K 3/3447 174/262 |
| 7,733,659 | B2* | 6/2010 | Snider | .................... | H04B 1/082 29/830 |
| 8,045,335 | B2* | 10/2011 | Takano | ................. | H01L 25/071 257/500 |
| 8,071,895 | B2 | 12/2011 | Shiu et al. | | |
| 8,357,015 | B2* | 1/2013 | Kohmura | .......... | B29C 45/14311 361/752 |
| 8,506,327 | B2* | 8/2013 | Jol | ...................... | B29C 45/1671 264/272.11 |
| 8,531,833 | B2 | 9/2013 | Diebel et al. | | |
| 8,531,834 | B2* | 9/2013 | Rayner | ................. | G06F 1/1656 277/644 |
| 8,690,600 | B1* | 4/2014 | Zeolla | .................... | H01R 13/72 439/131 |
| 8,711,568 | B2* | 4/2014 | Evens | .................... | G06F 1/1626 361/728 |
| 8,831,698 | B1* | 9/2014 | Paulis | .................... | A45C 11/00 379/440 |
| 8,953,335 | B2* | 2/2015 | Abe | ........................ | H01L 23/36 165/80.2 |
| 2004/0253859 | A1* | 12/2004 | Hirata | ................ | H01R 13/6485 439/181 |
| 2007/0004274 | A1* | 1/2007 | Tabata | ................. | H01R 13/514 439/540.1 |
| 2008/0204992 | A1* | 8/2008 | Swenson | ................ | G06F 1/1613 361/679.31 |
| 2008/0233803 | A1* | 9/2008 | Renteria | ............ | H01R 13/6658 439/620.15 |
| 2010/0078343 | A1* | 4/2010 | Hoellwarth | ........ | B29C 45/14639 206/320 |
| 2010/0264671 | A1 | 10/2010 | Zuo | | |
| 2011/0249394 | A1* | 10/2011 | Nielsen | ................. | G06F 1/1632 361/679.41 |
| 2011/0273854 | A1* | 11/2011 | Wagner | ................ | G01D 11/245 361/752 |
| 2013/0027863 | A1* | 1/2013 | Tsai | ................... | H01R 13/5213 361/679.4 |
| 2013/0140967 | A1 | 6/2013 | Duan et al. | | |
| 2013/0260607 | A1 | 10/2013 | Zhao et al. | | |
| 2013/0330951 | A1* | 12/2013 | Yudate | ............... | H01R 13/5202 439/271 |
| 2014/0043739 | A1* | 2/2014 | Deininger | ............ | A61N 1/3754 361/679.01 |
| 2014/0132085 | A1* | 5/2014 | Lamb | ....................... | H01R 3/00 307/150 |
| 2014/0141647 | A1* | 5/2014 | Do | ........................ | H01R 13/405 439/606 |
| 2014/0376182 | A1* | 12/2014 | Motoishi | .............. | F16M 11/105 361/679.55 |
| 2015/0098193 | A1* | 4/2015 | Loibl | ................. | H01R 13/5202 361/728 |
| 2015/0098198 | A1* | 4/2015 | Drew | .................... | H05K 5/006 361/752 |
| 2015/0230356 | A1* | 8/2015 | Shinoda | ................ | G06F 1/1656 455/575.8 |

OTHER PUBLICATIONS

"Industrial waterproof USB connectors having a panel cut-out of 15.6mm." Product description, 1 page. EE Times online publication. Posted online Dec. 10, 2009. http://www.eetimes.com/document.asp?doc_id=1270475.

"Waterproof USB Connectors." Product information, 1 page. Taitek Components Co. Ltd. Taipei, Taiwan. Viewed online at http://taitek.manufacturer.globalsources.com/si/6008800059530/pdtl/Water-tight-connector/1050912204/Waterproof-USB-Connectors.htm. Online publication at least as early as Jun. 2013.

\* cited by examiner

MOBILE COMPUTING DEVICE WITH A COMBINED HOUSING AND CONNECTOR PORT

TECHNICAL FIELD

The present application is directed to mobile computing devices and, more particularly, to devices having an outer housing with a combined connector port for connecting with a peripheral device.

BACKGROUND

Mobile computing devices such as laptop computers, personal digital assistants (PDAs), smartphones, tablet computers, ultra-mobile PCs, wearable computers, game consoles, and various other mobile communication devices are becoming more popular in today's society. One reason for the increased popularity is the increased number of different functions that these devices are able to perform. Just a few years ago, devices had limited functionality and were able to perform just a few functions. Further, the technology often made it cumbersome for the devices to be used to complete the various functions. However, the sophistication of these devices has greatly improved and now includes an increased number of functions that can be performed. Further, the devices are developed such that the functions are easily performed.

Figure 1:
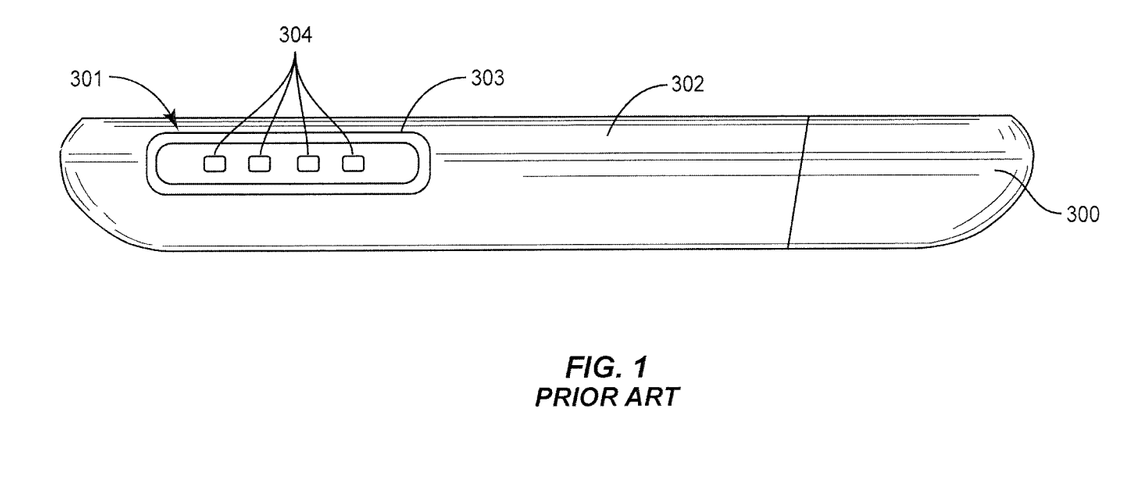
FIG. 1 is a side view of a prior art mobile computing device.

The devices are further configured with one or more ports for connecting with a peripheral device. This may include charging through a connection with a power source, or communications through a connection with another computing device. FIG. 1 illustrates an example of an existing mobile computing device 300 that includes a port 301 for connection with a peripheral device. The port 301 includes an outer guide 303 that extends around one or more contacts 304. The guide 303 is shaped to accommodate the corresponding connector of the peripheral device. The shape of the guide provides for engagement with the corresponding connector and to provide for electrical engagement with the contacts 304. The guide 303 is mounted within a housing 302 of the device 300. The housing extends around the internal components and forms the exterior shape of the device 300.

The port of a mobile computing device should be configured to provide for an adequate electrical connection with the peripheral device. Ideally, the port is small relative to the overall size of the device. The use of a separate guide in the port design tends to increase an overall size of the port. This increased size may not be acceptable for use in today's smaller designs. Further, additional components in the design may lead to a higher overall price for the device.

SUMMARY

The present application is directed to mobile computing devices that include one or more ports for connecting with a peripheral device. The device includes a housing that extends around an interior space that contains a variety of internal components. The port includes an outer guide that is formed by the housing and that extends around contacts.

One embodiment is directed to a mobile computing device that includes an energy storage device, a housing that includes exterior walls that form an interior space that houses the energy storage device. A cavity is formed by the housing and includes an open front side with enclosed side and back walls formed by the exterior walls of the housing with the back wall being opposite from the front side. An opening is positioned along the back wall of the cavity and extends through the housing and into the interior space. A connector is mounted in the cavity and includes a body connected to the side walls between the back wall and the front side. The body includes a first side that faces outward towards the front side of the cavity and a prong and pins. The body also includes an opposing second side that faces inward towards the back wall of the cavity and includes one or more contacts that are operatively connected to the pins and that extend outward from the second side and into the opening in the housing. The contacts are operatively connected to the energy storage device. The prong and the pins are directly adjacent the side walls of the cavity.

Each of the cavity and the body may include four planar side walls with the body sized relative to the cavity for each of the side walls of the body to be in contact against the side walls of the cavity.

The mobile computing device may also include an adhesive that extends between the body and the side walls to mount the connector in the cavity and to prevent an ingress of water and debris.

The connector may be mounted in the cavity with the second side of the body being spaced away from the back wall of the cavity.

The mobile computing device may also include one or more electrical extensions that extend through an interior of the body and electrically connect the pins with the contacts.

The mobile computing device may also include a display screen with the housing being shaped to extend around the display with the housing and the display together forming the interior space.

The open side of the cavity may be larger than the opening in the back wall of the cavity.

The connector may be a Universal Serial Bus (USB) connector.

Another embodiment is directed to a mobile computing device that includes an energy storage device. An outer housing protects the energy storage device and includes an inner side that faces towards the energy storage device and an opposing outer side that faces away from the energy storage device. A cavity is recessed into a wall of the housing and includes interior walls that are formed by the housing and that enclose the cavity. The cavity also includes an open side. An opening extends through one of the interior walls of the cavity. A connector is mounted in the cavity and includes a body with a first side with pins that extend outward towards the open side of the cavity. The body also includes an opposing second side that faces inward towards a back of the cavity and that includes one or more contacts that are operatively connected to the pins and that extend through the opening and are operatively connected to the energy storage device. The interior walls of the cavity extend along a length of the connector and are directly adjacent to the connector.

The side walls of the cavity and the wall of the housing may be an integral, one-piece construction.

The open side of the cavity may be aligned with a remainder of the wall of the housing.

The cavity may include a constant size and shape between the open side and the back of the cavity.

The pins may be directly adjacent the interior walls of the cavity.

The cavity may include a substantially rectangular sectional shape at the open side.

The housing may be constructed of a rigid material.

The cavity may be positioned along a lateral side of the device between a front side and a back side with the lateral side being narrower than the front side and the back side.

Another embodiment is directed to a mobile computing device and includes a housing that forms an exterior of the device. A cavity is recessed into a wall of the housing. An opening in a back side of the cavity extends through the housing. An energy storage device is positioned in the housing. A connector is mounted in the cavity and is operatively connected to the energy storage device. The connector includes: a body positioned in the cavity and having a first side that faces towards an open end of the cavity and a second side that faces towards the back side of the cavity; a prong with pins that extend outward from the first side of the body; contacts that are electrically connected to the pins and that extend outward from the second side of the body and through the opening in the back side of the cavity and are operatively connected to the energy storage device. A guide extends around the body and the pins with the guide being formed by the housing.

The connector and the housing may be constructed from two different materials.

The connector may be a Universal Serial Bus (USB) connector.

The present invention is not limited to the above features and advantages. Indeed, those skilled in the art will recognize additional features and advantages upon reading the following detailed description, and upon viewing the accompanying drawings.

DETAILED DESCRIPTION

The present application is directed to a mobile computing device that includes a housing that forms a portion of a port. The port includes a cavity that is formed in the housing and that includes interior walls. The port further includes a connector that is positioned in the cavity. The connector is positioned such that the walls of the cavity form the guide of the connector. The port is further constructed to prevent the ingress of water and/or debris into an interior of the housing.

Figure 2A:
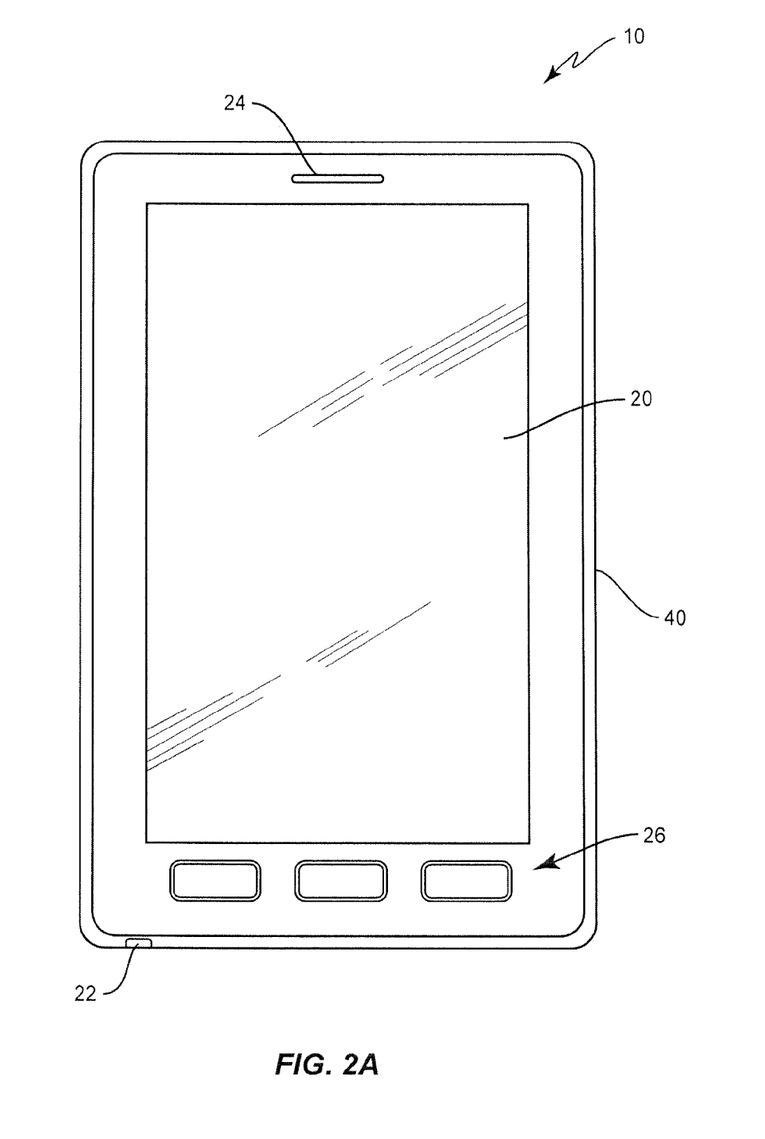
FIG. 2A is a front view of a mobile computing device.
Figure 2B:
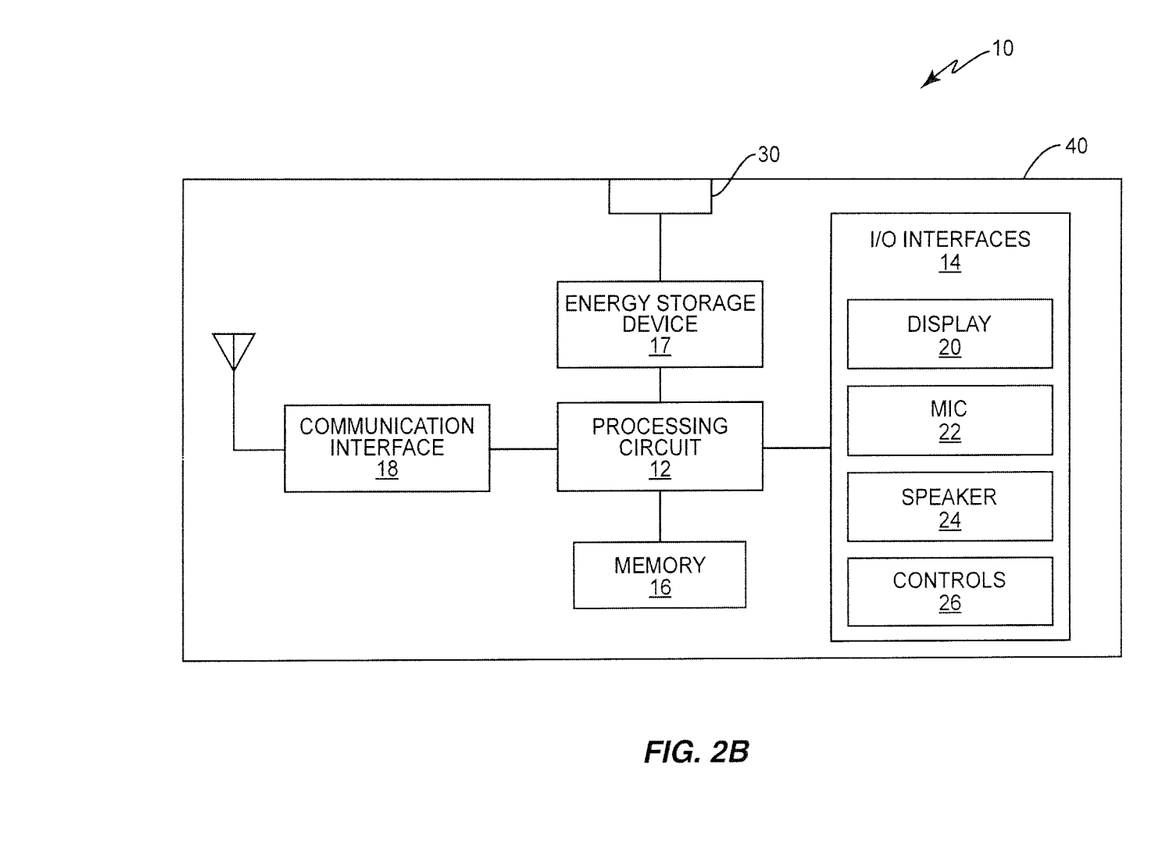
FIG. 2B is a schematic block diagram of a mobile computing device.

FIGS. 2A and 2B illustrate some of the components of a mobile computing device 10 configured to operate according to one embodiment. As seen in the figures and described in the specification, this embodiment comprises a cellular telephone, and more particularly, a "Smartphone." However, this is for illustrative purposes only. Those skilled in the art will appreciate that the present invention is also suitable for use in other mobile computing devices such as but not limited to laptop computing devices, ultra-mobile PCs, wearable computing devices, game consoles, Personal Digital Assistants (PDAs), and tablet computing devices (e.g., the iPAD, NOOK, KINDLE, etc.).

As seen in FIGS. 2A and 2B, the mobile communications device 10 configured according to one embodiment of the present invention comprises a processing circuit 12, a user Input/Output (I/O) interface 14, a memory 16, an energy storage device 17, and a communications interface 18.

The processing circuit 12 includes one or more processor circuits, including, for example, one or more microprocessors, microcontrollers, digital signal processors, or the like, and are also each configured with appropriate software and/or firmware to carry out one or more of the techniques to control the overall operation of the device 10. Processing circuit 12 executes programs and applications stored in memory 16, process signals transmitted and received by the wireless device, and control the overall operation of the wireless device 10. Memory 16 comprises one or more memory devices to store programs and data needed for operation on either a temporary or permanent, or semi-permanent basis. Memory devices may include, for example volatile memory (e.g., RAM) and/or nonvolatile memory (ROM, EEPROM, Flash). The communications interface 18 may include a cellular transceiver to enable the wireless device to communicate over cellular networks such as Wideband Code Division Multiple Access (WCDMA) networks, Long Term Evolution (LTE) networks, or WiMAX networks.

Input/output interface 14 includes input and output device to enable a user to interact with and control the wireless device 10. The user interface may include for example, a display 20 to output information for viewing by the user and one or more controls 26 such as keypads, dials, wheels, function keys, touch pads, etc. Some devices 10 may include a touch screen display that also functions as an input device. The user interface 14 may also include a microphone 22 to convert audible sounds into audio signals for input to the processing circuit 12, and one or more speakers 24 to convert audio signals output by the processing circuit 12 into audible sounds that can be heard by the user.

A port 30 provides for an interface for connecting with a peripheral device 200 for charging of an energy storage device 17. The energy storage device 17 is configured to power the device 10. FIG. 2B illustrates a connection between the energy storage device 17 and the processing circuit 12. It is understood that the energy storage device 17 may be further connected to provide power to one or more of the other components in the device 10. In one embodiment, the energy storage device 17 includes a battery that may be recharged through attachment at the port 30 with a peripheral device 200 that acts as a power source. The energy storage device 17 may be directly connected to the port 30, or there may be one or more intermediate components.

The port 30 provide for a connection for various functions, including charging through an exterior power source. The ports 30 may include a variety of different configurations. In one embodiment, the port is a USB serial connection port that may include a variety of formats, including but not limited to a standard A format and a standard B format.

In another embodiment, the port 30 is operatively connected to the processing circuit 12 and provides for communication with various peripheral devices.

The communications interface 18 may be any communication interface known in the art, but generally allows the user of device 10 to send and receive messages and data to and from a remote device over an established communications link. In one embodiment, the communication interface 18 is a fully functional cellular radio transceiver for transmitting signals to and receiving signals from a base station or other access node in a wireless communications network. In another embodiment, communications interface 18 comprises a short-range communications interface that permits the user to communicate data and information over relatively short distances—usually tens of meters. Those skilled in the art will appreciate that the communications interface 18 may implement any one of a variety of communication standards including, but not limited to, the standards known as the Global System for Mobile Communications (GSM), General Packet Radio Service (GPRS), Universal Mobile Telecommunication System (UMTS), TIA/EIA-136, cdmaOne (IS-95B), cdma2000, 3GPP Long Term Evolution (LTE), and Wideband CDMA (W-CDMA), and BLUETOOTH.

The device 10 further includes an exterior housing 40 that protects the internal components. The housing 40 may be operatively connected with the display 20 and extend around a remainder of the device 10 to form a protected interior space that houses the internal components. The housing 40 may be constructed as a single, unitary piece, or may include multiple separate pieces that are connected together in a permanent or removable manner. Connection options may include a snap-fit arrangement, mechanical fasteners, or adhesives. The housing 40 further provides for a waterproof exterior to prevent the ingress of water and debris into the interior space. One or more seals may be positioned at various locations along the housing 40. These may include but are not limited to between the housing 40 and the display 20, the input controls 26, and along different sections of the housing 40.

Figure 3:
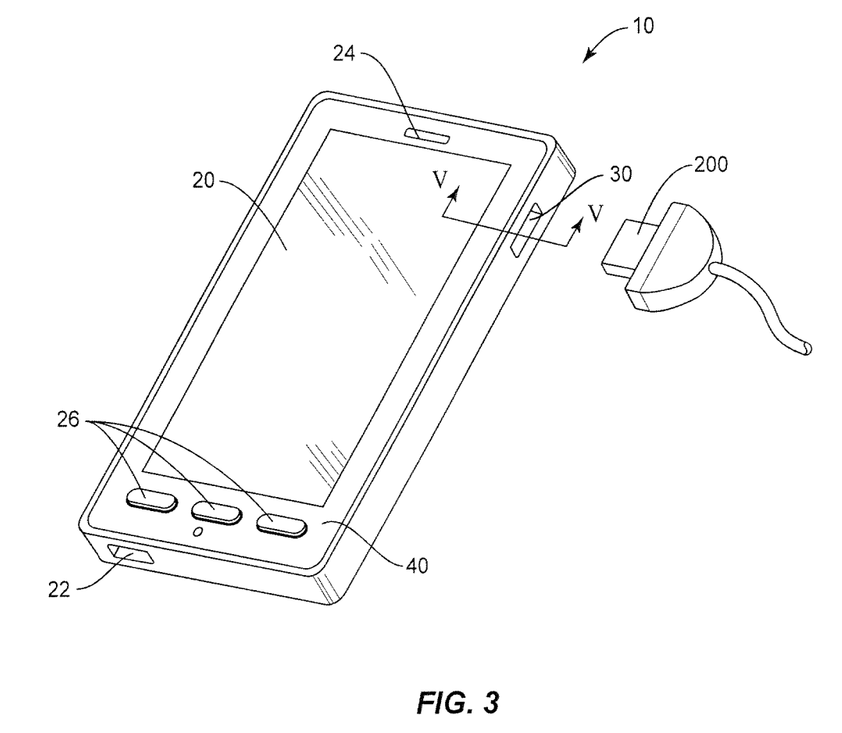
FIG. 3 is a perspective view of a mobile computing device that includes a port along a lateral side wall and a connector of a peripheral device.

The housing 40 is constructed of a rigid material, such as but not limited to hard plastic, metal, or other relatively inflexible material. The material is relatively thin and includes an inner side 46 that faces towards the interior space and an outer side 47 that faces outward (see FIG. 5). The housing 40 further provides a shape and feel to the device 10. Housing 40 may include a variety of different shapes and sizes depending upon the type of device 10 and the desired feel. As illustrated in FIG. 3, the housing 40 includes a substantially rectangular shape. In one embodiment as illustrated in FIG. 3, the housing 40 includes a number of separate walls, including a top wall that extends around the display 20, four lateral side walls, and a back wall (not illustrated). The port 30 may be positioned at various locations along the housing 40. FIG. 3 illustrates the port 30 located along one of the lateral sides between front and back of the device 10.

Figure 4:
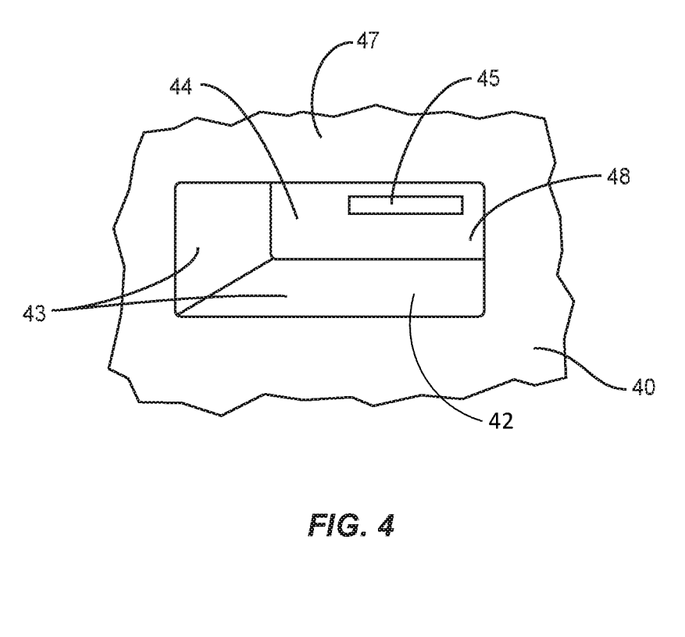
FIG. 4 is a perspective view of a cavity in a side wall of a housing.

The port 30 includes a cavity 42 formed in the housing 40, and a connector 50 positioned in the cavity 42. FIG. 4 illustrates the cavity 42 in the housing 40 (the connector 50 is not illustrated for purposes of clarity). The cavity 42 includes an open outer side 48 at the outer side 47 of the side wall of the device 10. The cavity 42 extends inward from the device wall and includes one or more side walls 43 and a back wall 44. The back wall 44 is opposite from the open side 48. The side walls 43 and back wall 44 are formed to prevent the ingress of water and/or debris into the interior of the device 10. This may include the walls 43, 44 formed as a single, integral piece, or from separate pieces that are connected together and/or sealed together. In one embodiment, the cavity 40 and device wall are formed from a single, integral piece.

An opening 45 is positioned in the back wall 44 for attaching the connector 50 to one or more of the internal components. The size and shape of the opening 45 may vary. In one embodiment, the opening 45 is smaller than the open outer side 48 of the cavity 40. The opening 45 may be positioned at various locations within the cavity 42. In some embodiments, the opening 45 may extend to one or more of the side walls 43, or may be positioned just on one or more of the side walls 43. In another embodiment, multiple openings 45 are located within the cavity 42.

Figure 5:
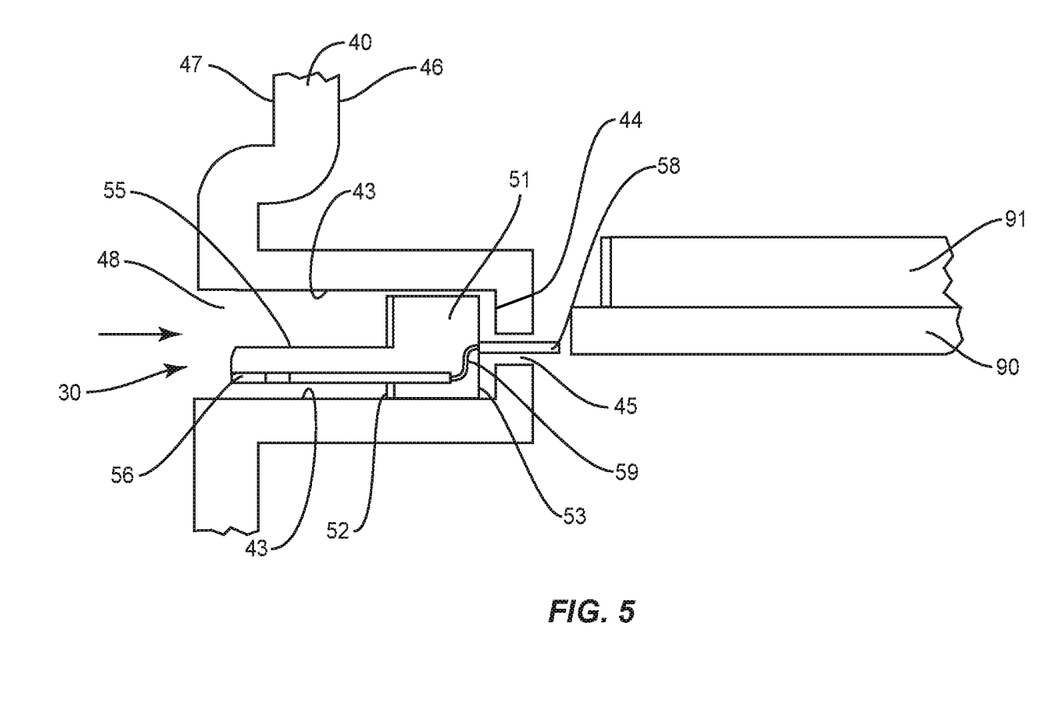
FIG. 5 is a schematic sectional view of a port cut along line V-V of FIG. 3.

FIG. 5 illustrates the port 30 that includes a connector 50 positioned in the cavity 42. The connector 50 includes a body 51 that is sized to fit within the cavity 42. The shape of the connector 50 may match that shape of the cavity 42 to facilitate mounting and attachment of the connector 50 to the housing 40. The connector 50 may be sized to abut against the side walls 43 of the housing cavity 42 when positioned in the cavity 42. In another embodiment, the connector 50 is smaller than the cavity 42 and is spaced away from the side walls 43 along at least one side of the body 51. The connector 50 may be attached to the housing 40 in various manners, including but not limited one or more adhesives, mechanical fasteners, and a friction fit. In one embodiment as illustrated in FIG. 5, the connector 50 is positioned in the cavity 42 with the second side 53 being spaced away from the back wall side 44 of the cavity 42. Adhesives may be positioned in this space to attach the connector 50 to the cavity 42, and to protect the opening 45.

In one embodiment, an adhesive is used to mount the connector 50 in the cavity 42. The adhesive may extend around one or more sides of the body 51, and may also be positioned along one or both of the first side 52 and the second side 53. The adhesive further provides for waterproofing protection to prevent the ingress of water and/or debris into the opening 45. In one embodiment, the body 51 is sized to abut against the inner sides of the side walls 43. This sizing prevents the ingress of water and/or debris that could potentially enter the housing interior 49 through the opening 45.

The connector body 51 includes a first side 52 that faces outward towards the open side 48 of the cavity 42. The first side 52 includes a prong 55 with pins 56 extending outward into the cavity 54. The opposing second side 53 includes contacts 58 that are extensions of or operatively connected to the pins 56. The contacts 58 extend outward beyond the second side 53 of the body 51 and are shaped and sized to extend through the opening 45. An extension 59 extends through the body 51 and electrically connects the pins 56 at the first side 52 with the contacts 58 at the second side 53.

The port 30 may be waterproof through one or more different manners. An adhesive that prevents the passage of water may be applied to the connector 50. In one embodiment, the adhesive fills a void between the back side 53 of the connector 50 and the back wall 44 of the cavity 42. The adhesive may be applied about the lateral sides of the body 51. The adhesive may also be applied across the opening 45 in the cavity 42 to prevent water from migrating into the interior of the device 10. During assembly of the device 10, the adhesive may be applied to the cavity 42 through the open side 48. Adhesive may also be applied from the interior of the device 10.

Waterproofing may also be facilitated by the size of the body 51 closely matching the size of the cavity 42. This provides for a tight interference fit that may further prevent or reduce the passage of water.

Figure 6:
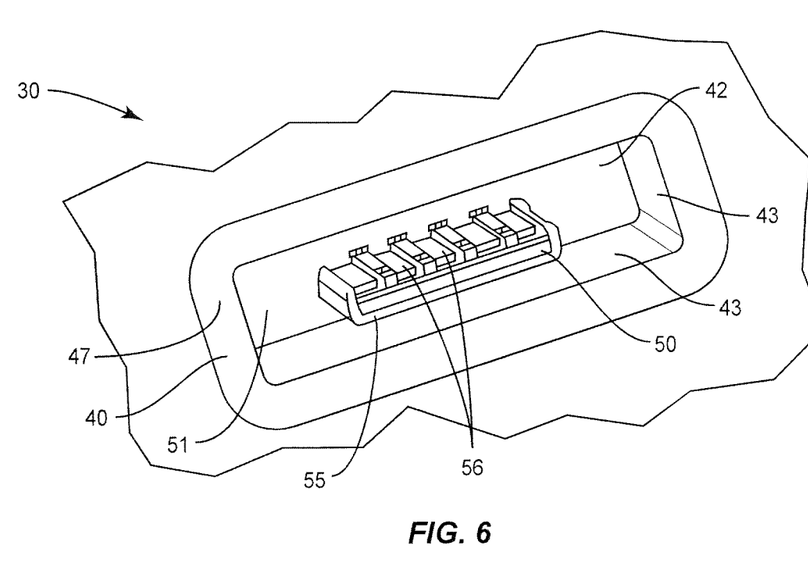
FIG. 6 is a front perspective view of a port in a mobile computing device.

FIG. 6 illustrates a front view of the port 30 with the connector 50 mounted in the cavity 42. The body 51 extends across the cavity and is mounted to the side walls 43. Both of the body 51 and the cavity 42 include substantially rectangular sectional shapes. The body 51 is sized relative to the cavity 42 such that each of the four sides abuts against a corresponding side of the cavity 42.

The prong 55 and pins 56 face outward for engagement with a corresponding plug of a peripheral device 200. The side walls 43 of the cavity 42 form the guide of the connector and are sized and shaped to engage with and guide the corresponding plug. The prong 55 and pin 56 are directly adjacent to the side walls 43 without an intervening shell. This design conserves materials, may reduce the overall size of the port 30, and provides for effective connections with the peripheral device 200.

Figure 7:
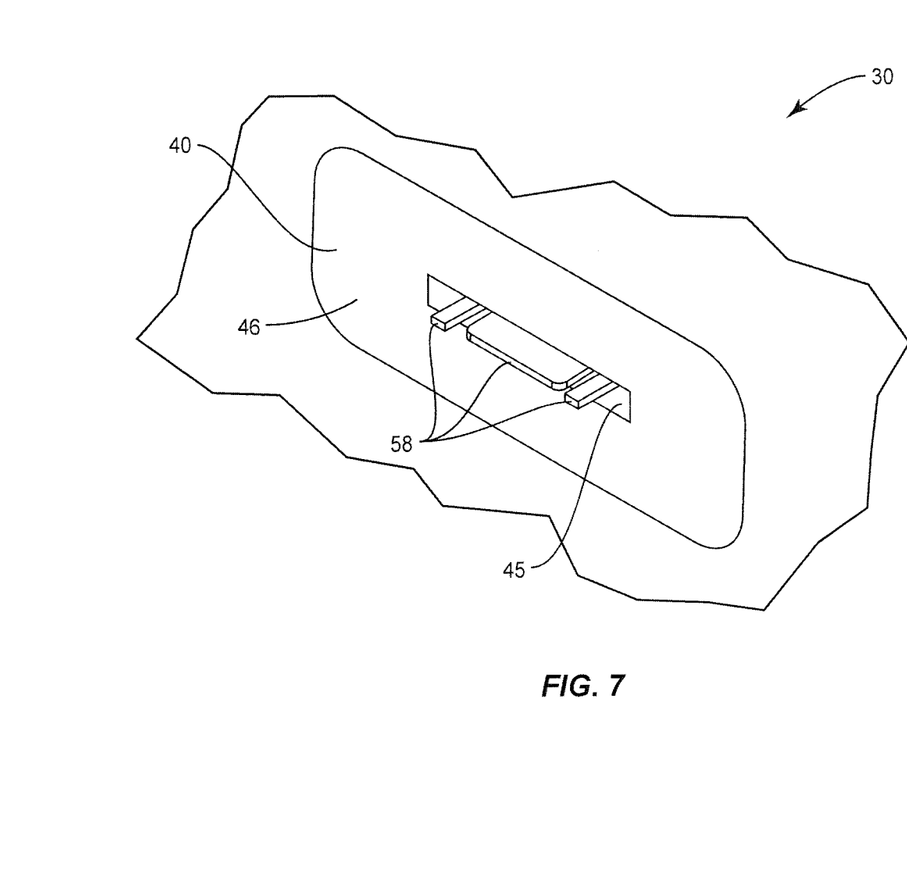
FIG. 7 is a rear perspective view of contacts extending through an opening in the housing.

FIG. 7 illustrates a rear view of the port 30 with the contacts 58 extending through the opening 45. The contacts 58 are sized to be operatively connected to one or more of the internal components as will be explained below.

Figure 8:
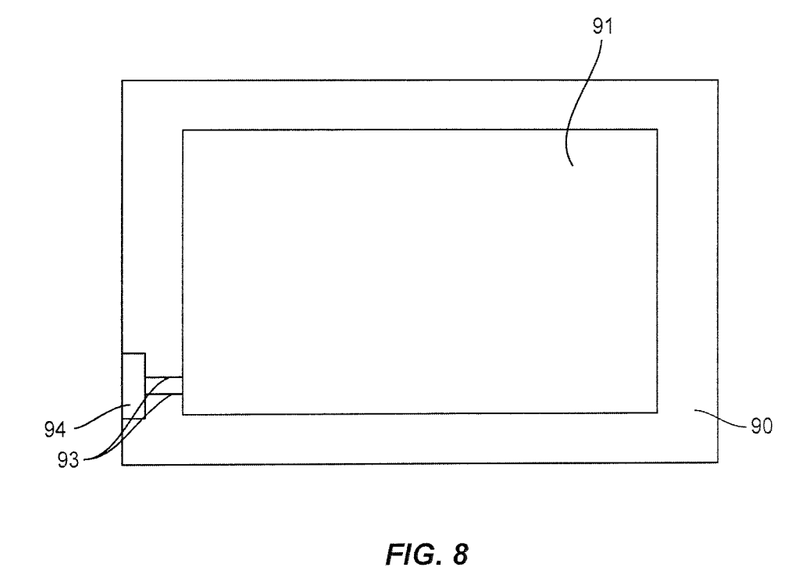
FIG. 8 is a schematic view of interior components configured to be operatively connected to the contacts of the port.

FIG. 8 illustrates an internal component that is positioned within the interior space formed by the housing 40. The internal component includes a circuit 91 mounted on a circuit board 90. The circuit 91 includes a contact 94 that are electrically connected with the contacts 58. One or more extensions 93 lead from the contact 94 to the circuit 91. In this embodiment, the circuit 91 is an intermediate component that is operatively connected to the energy storage device 17.

The device 10 includes a combined design in which the housing 40 also functions as a guide for the port 30. That is, the inner sides of the cavity 42 act to guide and contact against the corresponding peripheral device connector 200. The cavity 42 is shaped to accommodate the connector 200 and to ensure adequate contact between the connector 200 and the pins 56. The combination also reduces the number of components in the device 10 as there is no need for a separate shield that extends around the prong 55 and pins 56. The combination may also provide for an overall reduced size for the port 30. In one embodiment, the cavity 42 does not provide shielding for the connector 50. This may require that this design be used for just charging functions.

The side of the device 10 that includes the port 30 may include various shapes. In one embodiment, the side is substantially planar. In another embodiment as illustrated in FIG. 5, the side includes one or more curved sections with the port 30 positioned to facilitate connection with the peripheral connector 200.

In one embodiment, the port 30 is configured as a Universal Serial Bus (USB) interface. However, port 30 may also include other configurations. Examples include but are not limited to a variety of data communications ports known in the art, including a serial port, a parallel port, and the Institute of Electrical and Electronics Engineers (IEEE) 1394 ("firewire") interface.

The design is configured to provide a standardized interface for the device 10. The design may include a variety of different connectors 50. Further, the shape of the cavity 42 may vary depending upon the interface and associated connector 50.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A mobile computing device comprising:
   an energy storage device;
   a housing that includes exterior walls that form an interior space that houses the energy storage device, the housing having an outer side that faces outward;
   a cavity formed by the housing and that extends inward from the outer side, the housing includes an open front side at the outer side and enclosed side and back walls formed by the exterior walls of the housing, the back wall being opposite from the front side, a sectional shape of the cavity being constant along a length of the cavity from the open front side to the back wall;
   an opening along the back wall of the cavity that extends through the housing and into the interior space; and
   a connector mounted in the cavity and including a body connected to the side walls between the back wall and the front side and the body having a sectional shape that matches the sectional shape of the cavity and abuts against the side walls of the cavity, the connector being spaced away from the back wall with a void formed between a second side of the body and the back wall, the body including a first side that faces outward towards the front side of the cavity and includes a prong and plurality of pins, the body also including the second side that faces inward towards the back wall of the cavity and includes one or more contacts that are operatively connected to the plurality of pins and that extend outward from the second side and into the opening in the housing, the contacts being operatively connected to the energy storage device;
   an adhesive that fills the void between the second side of the body and the back wall of the cavity to connect the body to the housing, the adhesive also extends across the opening in the back wall of the cavity to prevent an ingress of at least one of water and debris;
   the prong and the plurality of pins being directly adjacent the side walls of the cavity.

2. The mobile computing device of claim 1, wherein each of the cavity and the body include four planar side walls with the body sized for each of the side walls of the body to be in contact against the side walls of the cavity.

3. The mobile computing device of claim 1, further comprising the adhesive being positioned between the body and the side walls to mount the connector in the cavity and to prevent the ingress of at least one of water and debris.

4. The mobile computing device of claim 1, further comprising one or more electrical extensions that extend through an interior of the body and electrically connect the plurality of pins with the contacts.

5. The mobile computing device of claim 1, further comprising a display screen with the housing being shaped to extend around the display, the housing and the display together form the interior space.

6. The mobile computing device of claim 1, wherein the open side of the cavity is larger than the opening in the back wall of the cavity.

7. The mobile computing device of claim 1, wherein the connector is a Universal Serial Bus (USB) connector.

8. A mobile computing device comprising:
   an energy storage device;
   an outer housing that protects the energy storage device and includes an inner side that faces towards the energy storage device and an opposing outer side that faces away from the energy storage device;

a cavity recessed into a wall of the housing and including interior walls that are formed by the housing and that enclose the cavity, the cavity also including an open side at the outer side of the housing and an opposing back wall spaced inward from the open side, the cavity having a sectional size and shape that is constant from the open side to the back wall;

an opening that extends through one of the interior walls of the cavity;

a connector mounted in the cavity and including a body with a first side with a plurality of pins that extend outward towards the open side of the cavity, the body also including an opposing second side that faces inward towards a back of the cavity and that includes one or more contacts that are operatively connected to the plurality of pins and that extend through the opening and are operatively connected to the energy storage device;

an adhesive that extends along the second side of the body and across the opening to prevent an ingress of at least one of water and debris;

the body and the cavity having matching sectional shapes and sizes such that side walls of the body that extend between the first side and the second side abut against the interior walls of the cavity;

the interior walls of the cavity extending along a length of the connector and being directly adjacent to the connector;

wherein the connector is directly adjacent the interior walls of the cavity without any intervening components positioned between the connector and the interior walls.

9. The mobile computing device of claim 8, wherein side walls of the cavity and the wall of the housing are an integral, one-piece construction.

10. The mobile computing device of claim 8, wherein the open side of the cavity is aligned with a remainder of the wall of the housing.

11. The mobile computing device of claim 8, wherein the plurality of pins are directly adjacent the interior walls of the cavity.

12. The mobile computing device of claim 8, wherein the cavity includes a substantially rectangular sectional shape at the open side.

13. The mobile computing device of claim 8, wherein the housing is constructed of a rigid material.

14. The mobile computing device of claim 8, wherein the cavity is positioned along a lateral side of the device between a front side and a back side, the lateral side being narrower than the front side and the back side.

15. A mobile computing device comprising:
a housing that forms an exterior of the device, the housing having an outer side;
a cavity recessed into a wall of the housing and having a constant sectional size that extends a length of the cavity from an open side at the outer side of the device to a back side;
an opening in the back side of the cavity that extends through the housing;
an energy storage device positioned in the housing;
a connector mounted in the cavity and operatively connected to the energy storage device, the connector including:
a body positioned in the cavity and having a first side that faces towards an open end of the cavity, a second side that faces towards the back side of the cavity, and side walls that extend between the first and second sides, the body having a shape that matches the cavity with the side walls abutting against the cavity;
a prong with a plurality of pins that extend outward from the first side of the body;
contacts that are electrically connected to the plurality of pins and that extend outward from the second side of the body and through the opening in the back side of the cavity and are operatively connected to the energy storage device;
a guide that extends around the prong and the plurality of pins, the guide being formed by the housing, the guide positioned directly adjacent to the prong and the plurality of pins without any intervening components between the guide and the prong and the plurality of pins.

16. The mobile computing device of claim 15, wherein the connector and the housing are constructed from two different materials.

17. The mobile computing device of claim 15, wherein the connector is a Universal Serial Bus (USB) connector.

* * * * *